United States Patent [19]

Gay et al.

[11] Patent Number: 4,883,155

[45] Date of Patent: Nov. 28, 1989

[54] CLUTCH RELEASE BEARING, IN PARTICULAR FOR AUTOMOTIVE VEHICLE

[75] Inventors: Christian Gay, Paris; Philippe Lassiaz, Boulogne, both of France

[73] Assignee: Valeo, Paris, France

[21] Appl. No.: 186,713

[22] Filed: Apr. 22, 1988

[30] Foreign Application Priority Data

Mar. 27, 1985 [FR] France ............................ 8504549

[51] Int. Cl.⁴ ..................................... F16D 23/14
[52] U.S. Cl. .............................................. 192/98
[58] Field of Search ................. 192/9 B, 110 B, 993; 384/523, 572, 580, 614, 621, 623, 495, 517, 563, 612

[56] References Cited

U.S. PATENT DOCUMENTS

| 559,972 | 5/1896 | Freese | 192/98 |
|---|---|---|---|
| 3,877,557 | 4/1975 | Maucher | 192/98 |
| 4,026,399 | 5/1977 | Ladin | 192/98 |
| 4,099,605 | 7/1978 | Ernst et al. | 192/98 |
| 4,186,828 | 2/1980 | Renaud | 192/98 |
| 4,498,566 | 2/1985 | Renaud | 192/98 |
| 4,529,075 | 7/1985 | Renaud | 192/98 |

FOREIGN PATENT DOCUMENTS

| 2099765 | 3/1972 | France . |
|---|---|---|
| 2396892 | 2/1979 | France . |
| 2508125 | 12/1982 | France . |
| 2533281 | 3/1984 | France . |
| 2049862 | 12/1980 | United Kingdom . |
| 2073353 | 10/1981 | United Kingdom . |

Primary Examiner—David A. Scherbel
Assistant Examiner—Caroline D. Dennison
Attorney, Agent, or Firm—Charles E. Brown; Charles A. Brown

[57] ABSTRACT

A clutch release bearing comprises a drive member through which it is adapted to operate on the clutch release device of a clutch. It also comprises an operating member through which it is adapted to be operated on by a clutch release yoke. The operating member incorporates two recesses the bottom of each of which faces axially towards the drive member and forms a transverse bearing facet. Each of the recesses is adapted to interlock with the clutch release yoke to prevent rotation of the clutch release bearing about its axis.

16 Claims, 2 Drawing Sheets

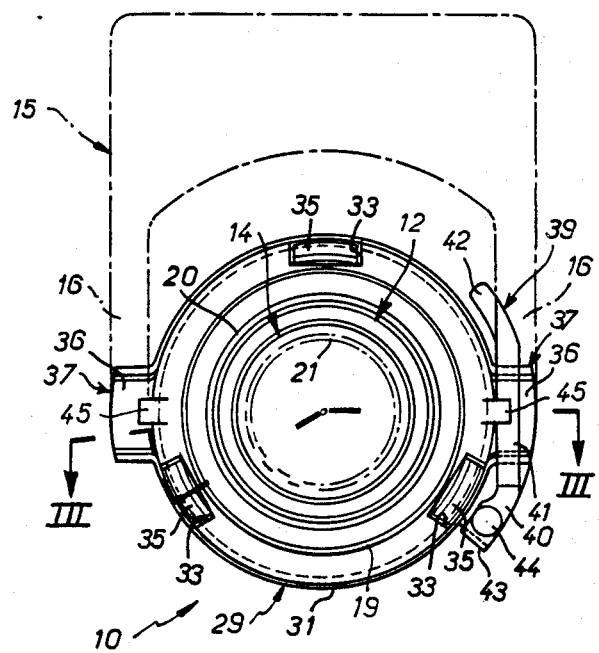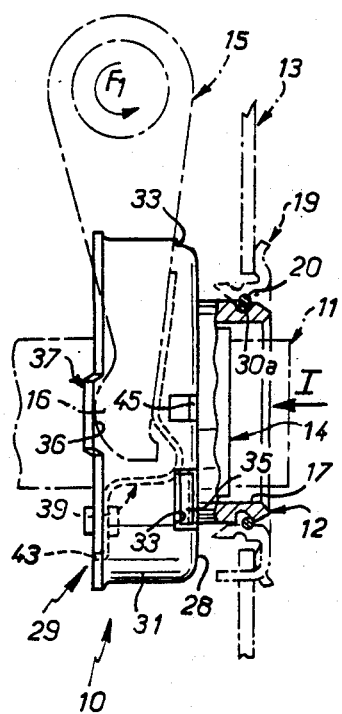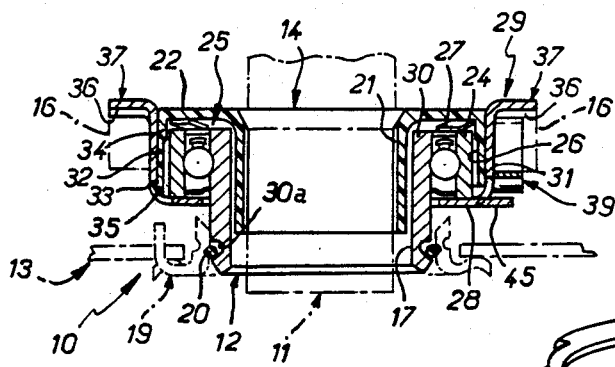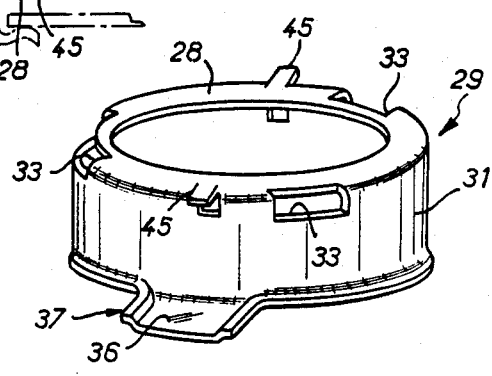

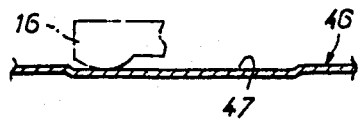
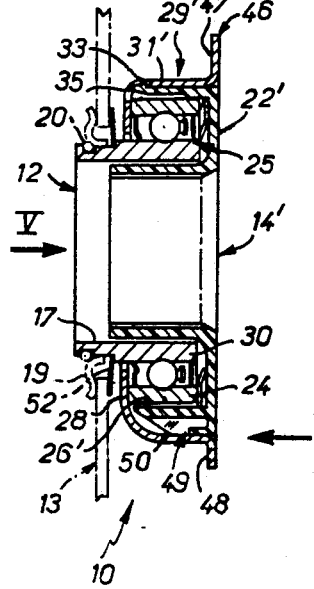
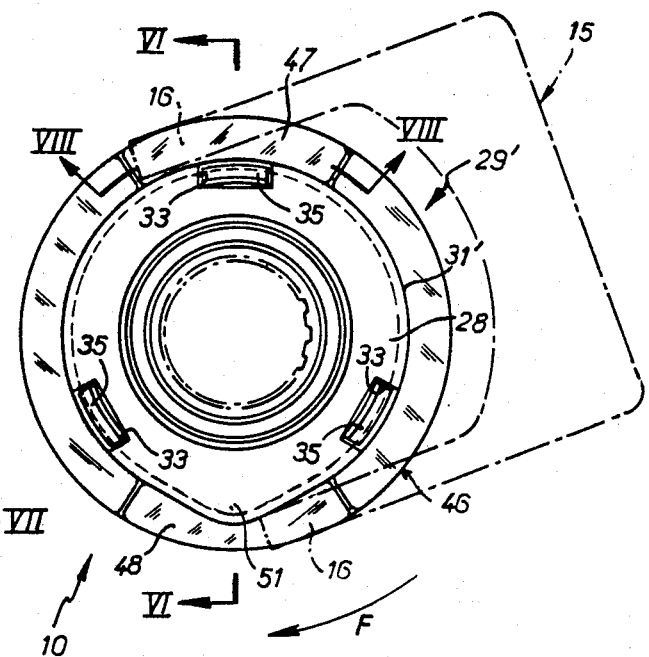
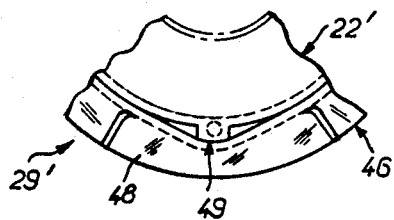

CLUTCH RELEASE BEARING, IN PARTICULAR FOR AUTOMOTIVE VEHICLE

This application is a continuation, of application Ser. No. 838,711, filed Mar. 12, 1986 abandoned.

BACKGROUND OF THE INVENTION

1. Field of the invention

The present invention is generally concerned with clutch release bearings, in particular those for automotive vehicles.

2. Description of the Prior Art

As is known, a clutch release bearing generally comprises an operating member through the intermediary of which it is adapted to be operated on by a control member, in practice a clutch release yoke, and a drive member which is coupled to said operating member by a cover, for example, and through the intermediary of which the clutch release bearing is adapted to operate on the clutch release device of a clutch.

The present invention is more particularly, but not necessarily exclusively, concerned with self-centering clutch release bearings, that is to say clutch release bearings in which the drive member is able to move relative to the operating member perpendicularly to the axis of the assembly wherein self-centering results.

One problem to be overcome in producing clutch release bearings of this type results from the fact that, because their drive member is then in contact with a rotating member, namely the clutch release device of the clutch concerned, they are subjected in service to forces tending to rotate them about their axis.

Any such rotation of the clutch release bearing about its axis in service could not fail to disturb the self-centering action, especially when the self-centering action is "maintained", that is to say when springloaded friction means are provided between the drive member and the operating member.

Thus it is desirable or even essential to prevent the clutch release bearing rotating about its axis in service.

To achieve this it has been proposed to key the clutch release bearing circumferentially to the clutch release yoke which is of course keyed against rotation about the axis of the clutch release bearing by virtue of its being pivotally mounted on the casing of the associated gearbox; when the clutch release bearing comprises a cover with which the clutch release yoke cooperates, it has been proposed to key the operating member circumferentially to the cover.

Concerning the circumferential keying of the clutch release bearing to the clutch release yoke, as the clutch release yoke in practice comprises two fingers through the intermediary of which it is engaged over a clutch release bearing of this kind so as to operate thereon, it has been proposed to employ two axial facets on the clutch release bearing, usually called axial guide facets, extending axially and parallel to each other and therefore adapted to cooperate with respective lateral surfaces of said fingers of the clutch release yoke, these surfaces facing each other.

Axial guide facets like these are not always easy to provide, especially where they must be formed on a cover.

Furthermore, they may themselves give rise to difficulties in certain types of clutch release bearing, more precisely "pull-type" clutch release bearings, that is to say clutch release bearings designed to operate in traction on the clutch release device of the clutch to be controled.

Such traction operation implies, on the one hand, that the drive member of the clutch release bearing is engaged behind the clutch release device of the clutch to be controled, or is engaged with some form of member, a coupling member, for example, itself engaged behind the clutch release device, and, on the other hand, that the clutch release yoke be engaged transversely between the clutch release device and transverse bearing facets provided for this purpose on the clutch release bearing.

In practice the clutch release yoke and the clutch release bearing form parts of two different assemblies, on the one hand that comprising the casing of the gearbox, which carries the clutch release yoke, and on the other hand that comprising the engine block, which usually carries the associated clutch and therefore the clutch release bearing.

At assembly time, that is to say when these two assemblies are brought axially towards each other, it is necessary to engage progressively the fingers of the clutch release yoke behind the transverse bearing facets of the clutch release bearing. However, demounting or disconnection of the two assemblies from each other must be possible for subsequent access to the clutch for changing or overhauling it, for example.

It must then be possible to disengage the clutch release yoke from the clutch release bearing.

The pivoting of the clutch release yoke required to engage it behind the transverse bearing facets of the clutch release bearing at assembly time or to disengage it therefrom at demounting time is not always possible, since it requires a non-negligible dead space which is not always available.

To eliminate such pivoting movements it has been proposed to provide between the clutch release bearing and the clutch release yoke a quarter-turn coupling whereby the clutch release bearing is turned about its axis through an angle sufficient for the transverse bearing facets to escape from the fingers of the clutch release yoke at demounting time, for example, so that they can then be disengaged axially relative thereto.

It is clear that when axial guide facets for the fingers of the clutch release yoke are provided on the clutch release bearing, these axial guide facets oppose rotation of the clutch release bearing about its axis.

Turning now to the circumferential keying of the operating member of the clutch release bearing to the cover, where it comprises a cover, it has been proposed, in particular in U.S. Pat. No. 4 529 075 and in a French patent of addition application filed 15 June 1983 under the number 83 09874 and published under the number 2 533 281 relating to a parent French patent filed 18 June 1981 under the number 81 12001 and published under the number 2 508 125, to exploit elastically deformable lugs (provided for coupling together the cover and the operating member) to procure such circumferential keying.

In practice these elastically deformable lugs form part of the operating member and cooperate with two openings provided for this purpose in the cover, the part cooperating with an opening being complementary thereto in the circumferential direction.

Although giving satisfaction, an arrangement of this kind has the disadvantage of applying non-negligible circumferential loads to the elastically deformable lugs in service.

For them to be able to withstand such loads, they must be made sufficiently thick, which is detrimental to their elasticity.

A general object of the present invention consists in arrangements which, while procuring in a satisfactory way the necessary circumferential retention of the clutch release bearing, make it possible to eliminate the disadvantages outlined hereinabove, conferring also other advantages.

SUMMARY OF THE INVENTION

The present invention provides a clutch release bearing comprising a drive member through the intermediary of which it is adapted to operate on the clutch release device of a clutch and an operating member having two recesses the bottom of each of which faces axially towards said drive member and forms a transverse bearing facet through the intermediary of which said clutch release bearing is adapted to be operated on by a clutch release yoke, wherein each of said recesses is adapted to interlock with said clutch release yoke to prevent rotation of said clutch release bearing about its axis.

Thus any rotation of the clutch release bearing relative to the clutch release yoke in service is impossible, without it being necessary to provide for this purpose any guide facets on the clutch release bearing.

For both directions of rotation the clutch release bearing comes into circumferential bearing engagement with the clutch release yoke, through the intermediary of one or other edges of the recesses whose bottoms form the transverse bearing facets.

Where a quarter-turn type coupling must be provided for the reasons stated hereinabove between the clutch release bearing and the clutch release yoke, the transverse bearing facets may in the usual way form part of radial lugs provided for this purpose on the clutch release bearing.

At demounting time it is then only necessary to pivot the clutch release yoke slightly to disengage it from the recesses provided in accordance with the invention on the clutch release bearing and so permit rotation of the clutch release bearing about its axis, as is necessary at this time.

However, when the necessary volume is available and it is possible to apply at assembly and demounting time significant pivoting movement to the clutch release yoke, the two transverse bearing facets of the clutch release bearing are, in accordance with another feature of the invention, advantageously linked to each other by a circumferentially continuous flange, the recesses of which they form the bottom resulting, for example, from simple local depression of the flange.

With an arrangement of this kind blind assembly is advantageously possible: once the clutch release yoke is engaged transversely behind the flange that the clutch release bearing thus features, it is sufficient to rotate the latter about its axis until the recesses formed locally in the flange come into face-to-face relationship with the ends or pads of the fingers of the clutch release yoke and these engage in them to provide the necessary circumferential interlock.

If required, elastic means may be provided to urge the clutch release yoke continuously towards the transverse bearing facets of the clutch release bearing.

For example, these elastic means are preferably carried permanently by the clutch release bearing.

Also, when a cover is provided for coupling the drive member axially to the operating member, with means for preventing rotation of the operating member on the cover, the rotation preventing means preferably comprise a projection carried by the operating member adapted to interlock with a local deformation in the cover.

Thus when elastically deformable lugs are provided between the operating member and the cover, they may be relieved of the rotational blocking function so that, by making their ends thinner, they may advantageously be made more flexible, if required.

Also, circumferential play may advantageously be provided between the portion of the elastically deformable lugs cooperating with an opening in the cover and the opening, so as to protect them from deterioration in service.

For example, when, as is usually the case, the operating member features a transverse flange, the projection provided in accordance with the invention on the operating member may simply consist of a peg radially extending said flange.

This peg is preferably itself extended axially, specifically and advantageously to stiffen it.

The end of this axial extension of the peg is preferably beveled and, the cover comprising a circumferentially continuous annular side wall, the deformation that the cover features in accordance with the invention for cooperation with the corresponding projection on the operating member is preferably a V-shaped deformation in the annular wall.

As a result, the relative axial engagement of the cover over the operating member required at assembly time is advantageously facilitated and simplified, the projection on the operating member constituting with the deformation in the cover means for registering these members and the beveled axial extension of this projection itself procuring, through cooperation with the V-shaped configuration of the deformation in the cover, significant guidance during such axial engagement.

Finally, the summit of the V-shaped deformation thus provided locally in the annular wall of the cover is preferably situated generally in line with the median area of one of the recesses the bottom of which constitutes one of the transverse bearing facets of the assembly.

The clutch release device in accordance with the invention thus advantageously has a plane of symmetry so that the circumferential direction in which the rotational loads to which it it subject in service tend to cause it to rotate about its axis is immaterial.

The characteristics and advantages of the invention will emerge from the following description given by way of example with reference to the accompanying diagrammatic drawings.

BRIEF DESCRIPTION OF THE DRAWINGS

FIG. 1 is a view in elevation of a clutch release bearing in accordance with the invention.

FIG. 2 is a side view in the direction of the arrow II in FIG. 1.

FIG. 3 is an axial cross-section on the plane III—III in FIG. 1.

FIG. 4 is a perspective view of the cover used in this clutch release bearing.

FIG. 5 is a view in elevation of an alternative embodiment of release bearing in accordance with the invention.

FIG. 6 is an axial cross-section on the plane VI—VI in FIG. 5.

FIG. 7 is a partial view in the direction of the arrow VII in FIG. 6.

FIG. 8 is a cross-section on the line VIII—VIII in FIG. 5.

DESCRIPTION OF THE PREFERRED EMBODIMENTS

As shown in the figures, the clutch release bearing 10 is represented in full line whereas the members with which it is intended to cooperate are schematically represented in chain-dotted line, in particular the guide member 11. The clutch release bearing 10 in accordance with the invention generally comprises a drive member 12 through the intermediary of which it is adapted to operate on the clutch release 13 of the clutch and an operating member 14 through the intermediary of which it is adapted to be operated on by a control member 15.

The operating member 14 comprises an axial sleeve 21 through the intermediary of which the clutch release bearing 10 is adapted to be slidably engaged on any form of guide support, for example the flared guide tube usually surrounding the input shaft of the associated gearbox.

The clutch release device 13 is shown only in part in FIGS. 2 and 3. It may consist, for example, of the ends of radial fingers of a diaphragm.

Likewise, the control member 15 is only partially represented in FIG. 1. In practice it comprises a control yoke the fingers 16 of which are engaged transversely over the clutch release bearing 10 at two diametrally opposite points.

For example and as shown here, the clutch release yoke is mounted on the casing of the gearbox to rotate about an axis at right angles to the axis of the guide member 11. For the purpose of its operation on the clutch release bearing 10, the clutch release yoke 15 comprises two fingers 16 by means of which it embraces the clutch release bearing 10 and the ends of which are shaped so as to be able to operate on the latter.

Consisting in practice of a clutch release bearing designed to operate in traction on the clutch release device 13, the clutch release bearing 10 in accordance with the invention has a drive member 12 that comprises a sleeve 17 which has a transverse coupling member 19 at one end carried permanently by the clutch release device 13 and to which the clutch release bearing 10 is attached snap-fastener fashion through its drive member 12 at assembly time with an elastically deformable ring 20 provided for this purpose between the coupling member 19 and the drive member 12.

The operating member 14 comprises a transverse flange 22 attached to the sleeve 21 itself extended by an axial rim 26.

In practice the sleeve 21 and the flange 22 are in one piece, the combination being obtained, for example, by molding any appropriate synthetic material.

The drive member 12 is mainly accommodated within the internal volume defined by the operating member 14, between the sleeve 21 and the axial rim 26; in the embodiment shown it is formed by a ball bearing 25 the outer race 24 of which, acted on by an axially acting spring washer 27 bearing against the annular flange 22 of the operating member 14, presses through its opposite edge on the bent over edge 28 of the cover 29; its internal race 30 is adapted by means of a retaining groove 30a to cooperate with the elastic ring 20, the internal race 30 projecting axially for this purpose outside the cover 29, by means of the central opening in the bent over edge 28 of the latter.

In practice the elastic ring 20 is adapted to cooperate with a drive bearing surface forming part of the coupling member 19.

The drive bearing surface/retaining groove arrangement is well known in itself, for example from French patent application No. 83 06847 filed 28 Apr. 1983 and published under the number 2 545 172 and U.S. patent application Ser. No. 603 287 filed 24/04/84 now U.S. Pat. No. 4,588,061 which is incorporated herein by reference.

For securing the assembly the drive member 12 is coupled axially to the operating member 14 by the cover 29. For descriptive purposes, the combination of the operating member 14 and the cover 29 will be considered to be operating means.

The cover 29 comprises an annular side wall 31 extending axially. This annular wall 31 couples the cover 29 to the flange 22 of the operating member 14.

For example, and as shown here, clipping means with elastically deformable lugs 32 and openings 33 are provided to this end between the annular wall 31 of the cover 29 and the flange 22 of the operating member 14.

These elastically deformable lugs 22, of which there are three, regularly spaced in the circumferential direction, for example, are part of the operating member 14 and the corresponding openings 33 are part of the cover 29.

In practice the elastically deformable lugs 32 project axially from the flange 22 of the operating member 14, locally interrupting the ring formed by the axial rim 26 of the flange 22, and feature a bead 35 projecting radially outwards to cooperate with the corresponding opening 33.

In the circumferential direction the bead 35 is complementary to the opening 33.

Axial play is preferably provided between the bead 35 of an elastically deformable lug 32 and the corresponding opening 33 in the cover 29.

As this is a maintained self-centering clutch release bearing, the drive member 12 is able to move in any radial direction relative to the operating member 14 within the limits of a predetermined annular clearance provided for this purpose between the ball bearing 25 of the drive member 12 and the ring 26 of the operating member 14.

The clutch release bearing 10 in accordance with the invention comprises, at diametrally opposed positions, two transverse bearing facets 36 for the clutch release yoke 15 to operate on which extend generally radially to co-operate with the ends of the fingers 16 of the clutch release yoke 15. These transverse bearing facets 36 each form part of a lug 37 which is in one piece with the cover 29, extending transversely in substantially the same plane as the annular flange 22 of the operating member 14.

It is thus through the intermediary of the cover 29 that the operating member 14 is in this case adapted to be operated on by the clutch release yoke 15.

Each of the lugs 37 that the cover 29 thus comprises has its main part slightly offset axially in the direction opposite that of the bent over edge 28 relative to its lateral edges which are substantially in line with the end concerned of the cover 29.

It thus features a recess forming a concavity facing axially towards the drive member 12 of the release bearing.

Displacement of the yoke in the direction opposite to its bearing direction over a distance equal to the depth of this recess is then sufficient to secure rotational releasing of the release bearing and so to permit decoupling thereof from the clutch release device of the clutch.

A leaf spring 39 is disposed substantially circumferentially around the clutch release bearing 10 that carries it and comprises, in succession, a first section 40 by which it is attached to the clutch release bearing 10, a second section 41 by which it extends generally tangentially to the annular wall 31 of the cover 29, and a third section 42 forming its free end.

By means of its first section 40 the leaf spring 39 is attached by a rivet 44 to a radial lug 43 of the clutch release bearing 10. The radial lug 43 is in one piece with the cover 31 of the clutch release bearing 10 and continuous with the lug 37 of the latter on which is formed the transverse bearing facet 36 concerned.

In the embodiment shown the second section 41 of the leaf spring 39 is generally S-shaped as seen from the side (FIG. 2) in order to bear on a transverse side of a finger 16 of the clutch release yoke 15.

At assembly time the clutch release bearing 10 is placed on its guide 11 which is carried by the casing of the gearbox and the fingers 16 of the clutch release yoke 15 are engaged with it, each of the fingers 16 being inserted into the recess formed on the corresponding bearing facet 36, one of them also being engaged under the median section 41 of the leaf spring 39.

The assembly which comprises the gearbox equipped in this way with the clutch release bearing 10 and the clutch release yoke 15 is brought towards the engine block carrying the clutch to be controled. To couple the clutch release bearing 10 to the clutch release device 13 of the clutch, it is sufficient to move the clutch release bearing 10 axially towards the clutch release device 13 and pivot the clutch release yoke 15 about its axis in the direction of the arrow F1 in FIG. 2.

Operating on tangs 45 provided for this purpose on the cover 29 of the clutch release bearing 10, the clutch release yoke 15 then secures snap-fastener type engagement of the drive member 12 of the clutch release member 10 onto the coupling member 19 carried by the clutch release device 13.

The bearing facets 36 with their recesses, one of these facets being associated with leaf spring 41, constitute retaining means adapted to oppose any rotation of the clutch release bearing 10 about its axis in service.

The return spring means constituted by this spring could equally well be disposed at another location whilst still retaining the role of continuously urging the control member 15 towards the transverse bearing facet.

The embodiment of FIGS. 5 through 8 illustrates two other features of the invention.

Unlike the preceding embodiment, the coupling member 19 is no longer carried permanently by the clutch release device 13, but bears axially on the ring 30 via the ring 20, a Belleville washer 52 bearing against a shoulder of said ring 30 so as to clamp the clutch release device between the washer 52 and the coupling member 13.

According to one feature of this embodiment, the cover 29' differs from the cover 29 of the previous embodiment in that it features at its periphery a continuous flange 46, two depressions 47 and 48 at diametrically opposite locations on the flange replacing the bearing facets 36 formed on the lugs 37 of FIGS. 1 through 4.

An embodiment of this kind gives the cover a more favorable structure from the mechanical and manufacturing points of view because of the continuous nature of the peripheral rim formed by the flange 46. However, because of this continuity there is lost the possibility of the release bearing escaping axially between the fingers of the yoke on limited pivoting of the yoke 15: at assembly and demounting time it is in this case necessary to provide sufficient volume for enough pivoting to occur to release the flange as a whole.

However, provided that this condition can be met, there is obtained the advantageous possibility of blind assembly: once the yoke is engaged behind the flange 46, it is sufficient to turn the latter about its axis until the ends of the fingers 16 are disposed in the localized depressions 47 and 48, so that the release bearing is then keyed circumferentially.

According to another feature of this embodiment the means for preventing rotation of the cover 29' relative to the operating member 14' are improved: the flange 22' of the operating member 14' has a peg-shaped peripheral projection 49 with an axial extension 50 merging through a bevel with a free edge of the axial rim 26'.

The skirt 31' of the cover features a generally V-shaped deformation 51 adapted to cooperate with the aforementioned peg. By virtue of the resulting circumferential keying between the cover 29' and the operating member 14 the elastically deformable lugs 32 are relieved of this circumferential keying function and serve only to axially couple the cover and the operating member. This means that the lugs 32 may be made lighter and that a relatively large circumferential clearance be provided between the end parts 35 of the lugs and the openings 33 intended to receive them, facilitating assembly.

It is thus the radial projection in the form of the peg 49 which constitutes together with the deformation 51 in the cover the indexing means between these members procuring relative guidance during axial engagement thereof.

As can be seen in FIG. 5, the summit of the deformation 51 is in line with the median area of the recess 48 whose bottom constitutes a bearing facet for one finger 16 of the clutch release yoke 15. The bearing area actually used is situated in this case between the deformation 51 and that of the edges of the recess which is on the upstream side relative to the direction of rotation indicated by the arrow F. Given that the structure in question has a plane of symmetry corresponding in FIG. 5 to the cross-section plane indicated at VI—VI, it will be understood that in the event of rotation in the opposite direction the effective bearing area will be disposed on the other side of the deformation 51. The release bearing is thus adapted to resist rotational loads to which it may be subjected because of the drag torque of the bearing, whichever direction of rotation of the motor it may be associated with.

The indexing system just described with reference to FIGS. 5 through 8 is naturally also suitable for combination with bearing facets provided in accordance with FIGS. 1 through 4 on lugs projecting radially from the perimeter of the cover towards the release bearing.

Moreover, it remains possible, of course, to provide two leaf springs 39 at diametrally opposite positions to operate simultaneously on the two fingers of the clutch release yoke.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. Clutch release bearing, comprising a drive member cooperable with a clutch release device of a clutch and an operating means having two axially shallow recesses, the bottom of each of the recesses faces axially towards said drive member and forms a transverse bearing facet cooperable with a clutch release yoke, the clutch release bearing being angularly displaceable relative to the clutch release yoke to bring said recesses into and out of registration with the clutch release yoke for selectively mounting and dismounting the clutch release bearing, wherein each of said recesses forms means for interlocking with said clutch release yoke to prevent, in operation, rotation of said operating means about the axis of the clutch release bearing, said operating means comprising an operating member and a cover for coupling said drive member axially to said operating member, wherein said transverse bearing facets are in one piece with said cover.

2. Clutch release bearing according to claim 4, further comprising elastic means for urging said clutch release yoke constantly axially towards said transverse bearing facets.

3. Clutch release bearing according to claim 2, wherein said elastic means are carried by said operating means.

4. Clutch release bearing according to claim 3, wherein said operating means has a radial lug carrying said elastic means.

5. Clutch release bearing according to claim 4, wherein said elastic means comprise a leaf spring riveted to said radial lug.

6. Clutch release bearing according to claim 3, wherein said elastic means comprise a generally S-shaped leaf spring.

7. Clutch release bearing according to claim 1, wherein said cover has a flange at its periphery and said bearing facets comprise two depressions at diametrally opposed positions on said flange.

8. Clutch release bearing according to claim 1, wherein elastic means are carried by the operating means for urging the clutch release yoke axially towards said transverse bearing facets.

9. Clutch release bearing comprising a drive member cooperable with a clutch release device of a clutch and an operating means having two recesses, the bottom of each of the recesses faces axially towards said drive member and forms a transverse bearing facet cooperable with a clutch release yoke, wherein each of said recesses forms means for interlocking with said clutch release yoke to prevent rotation of said operating means about the axis of the clutch release bearing and wherein said operating means includes an operating member and a cover having means for coupling said drive member axially to said operating member and means for preventing rotation of said operating member relative to said cover, wherein said rotation preventing means comprise a projection carried by said operating member for interlocking with a local deformation in said cover.

10. Clutch release device according to claim 9, wherein said cover comprises an annular lateral wall extending axially and said local deformation in said cover is a V-shaped deformation in transverse section in said annular wall.

11. Clutch release bearing according to claim 10, wherein said operating member comprises a transverse flange and said projection is a peg forming a radial extension of said flange.

12. Clutch release device according to claim 11, wherein said peg has an axial extension.

13. Clutch release device according to claim 12, wherein the end of said axial extension of said peg is beveled.

14. Clutch release bearing according to claim 10, wherein said V-shaped deformation has an apex located substantially at the middle of one of said transverse bearing facets.

15. Clutch release bearing according to claim 10, wherein said V-shaped deformation has an apex, and said clutch release bearing is of symmetrical construction relative to a diametral plane passing through said apex, wherein said transverse bearing facets have bearing areas on respective sides of said plane.

16. Clutch release bearing comprising a drive member cooperable with a clutch release device of a clutch and an operating means having two axially shallow recesses, the bottom of each of the recesses facing axially towards said drive member and forming a transverse bearing facet cooperable with a clutch release yoke, the clutch release bearing being angularly displaceable relative to the clutch release yoke to bring said recesses into and out of registration with the clutch release yoke for selectively mounting and dismounting the clutch release bearing, wherein each of said recesses forms means for interlocking with said clutch release yoke to prevent, in operation, rotation of said operating means about the axis of the clutch release bearing said operating means comprising an operating member and a cover for coupling said drive member axially to said operating member, wherein said transverse bearing facets are in one piece with said cover, and a lug in one piece with said cover substantially coplanar with said annular flange of said operating member and said transverse bearing facets each forming part of said lug.

* * * * *